(12) United States Patent
Wang et al.

(10) Patent No.: US 12,476,777 B2
(45) Date of Patent: Nov. 18, 2025

(54) CHIP COMMUNICATION CIRCUIT, METHOD, AND APPARATUS BASED ON AUTOMATIC CLOCK SYNCHRONIZATION

(71) Applicant: Beijing HyperStrong Technology Co., Ltd., Beijing (CN)

(72) Inventors: Hailong Wang, Beijing (CN); Guang Yang, Beijing (CN); Qiangqiang Liu, Beijing (CN); Xiangchun Cheng, Beijing (CN)

(73) Assignee: Beijing HyperStrong Technology Co., Ltd., Beijing (CN)

( * ) Notice: Subject to any disclaimer, the term of this patent is extended or adjusted under 35 U.S.C. 154(b) by 0 days.

(21) Appl. No.: 18/680,750

(22) Filed: May 31, 2024

(65) Prior Publication Data
US 2025/0030530 A1    Jan. 23, 2025

(30) Foreign Application Priority Data
Jul. 18, 2023   (CN) .......................... 202310887345.2

(51) Int. Cl.
| | |
|---|---|
| *H04L 7/00* | (2006.01) |
| *H04L 7/04* | (2006.01) |
| *H04L 12/40* | (2006.01) |

(52) U.S. Cl.
CPC .............. *H04L 7/0008* (2013.01); *H04L 7/04* (2013.01); *H04L 12/40013* (2013.01)

(58) Field of Classification Search
CPC ............ H04M 1/72527; H04M 2/1016; G01R 31/2886; G01R 1/06722; H04L 12/40013;
(Continued)

(56) References Cited

U.S. PATENT DOCUMENTS

| | | |
|---|---|---|
| 7,948,373 B2 | 5/2011 | Bauer et al. |
| 8,908,779 B2 | 12/2014 | Douglass |
| (Continued) | | |

FOREIGN PATENT DOCUMENTS

| | | |
|---|---|---|
| CN | 102882248 A | 1/2013 |
| CN | 112398480 A | 2/2021 |
| (Continued) | | |

OTHER PUBLICATIONS

Extended European Search Report dated Nov. 4, 2024 for Application No. 24179085.6.
(Continued)

*Primary Examiner* — Khai Tran

(57) ABSTRACT

The present application provides a chip communication circuit, method and apparatus based on automatic clock synchronization. The method includes: determining clock synchronization information of a first battery management chip in response to a received control instruction; replacing a chip selection enable signal in the control instruction with a clock synchronization signal carrying the clock synchronization information of the first battery management chip to obtain a new control instruction; and transmitting the new control instruction to other battery management chips, so that the other battery management chips perform automatic clock synchronization based on the clock synchronization information carried in the new control instruction; where the other battery management chips are battery management chips among the multiple battery management chips except for the first battery management chip, and a daisy chain with a sinusoidal sawtooth waveform is used for isolated communication between different battery management chips.

14 Claims, 8 Drawing Sheets

(58) Field of Classification Search
CPC .... H04L 7/0008; H04L 7/04; H01M 10/4207; H01M 10/4257; H01M 10/486
USPC .......................................................... 375/354
See application file for complete search history.

(56) References Cited

U.S. PATENT DOCUMENTS

| | | | |
|---|---|---|---|
| 2010/0254221 A1 | 10/2010 | Smith | |
| 2013/0231793 A1* | 9/2013 | Elliott ................... | G05B 15/02 700/292 |
| 2014/0075072 A1 | 3/2014 | Alley et al. | |
| 2015/0270727 A1 | 9/2015 | Fukute et al. | |
| 2016/0120448 A1 | 5/2016 | Hernandez-Rosas et al. | |
| 2018/0359351 A1* | 12/2018 | Zhao ................... | H04M 1/0249 |
| 2018/0368064 A1 | 12/2018 | Zakrzewski et al. | |
| 2021/0157766 A1 | 5/2021 | Kessler et al. | |
| 2025/0004750 A1* | 1/2025 | Xu ...................... | G01R 31/387 |

FOREIGN PATENT DOCUMENTS

| | | |
|---|---|---|
| CN | 114443550 A | 5/2022 |
| CN | 115291833 B | 12/2022 |
| JP | H089305 A | 1/1996 |

OTHER PUBLICATIONS

Anonymous: "Sawtooth wave Wikipedia" Feb. 17, 2023, URL:https://en.wikipedia.org/w/index.php?title=Sawtooth_wave&oldid=1139895676.

Anonymous: "Pulse-amplitude modulation—Wikipedia", Jun. 30, 2023, URL:https://en.wikipedia.org/w/index.php?title=Pulse-amplitude_modulation&oldid=1162690118.

Anonymous: "Square wave—Wikipedia", May 10, 2023, URL:https://en.wikipedia.org/w/index.php?title=Square_wave&oldid=1154134949.

Notice of Reasons for Refusal dated Mar. 12, 2025 Patent Application Number: Japanese Patent Application No. 2024-088645.

* cited by examiner

| Pulse name | First level | Second level | Third level | Fourth level | Waveform |
|---|---|---|---|---|---|
| Data sinusoidal sawtooth wave (Number 1) | Vp1 (1/2 t1) | Vp2 (1/2 t1) | -Vp1 (1/2 t1) | -Vp2 (1/2 t1) | |
| Data cosinusoidal sawtooth wave (Number 0) | -Vp1 (1/2 t1) | -Vp2 (1/2 t1) | Vp1 (1/2 t1) | Vp2 (1/2 t1) | |
| Clock synchronization sinusoidal sawtooth wave (Number 1) | Vp1 (1/2 t2) | Vp2 (1/2 t2) | -Vp1 (1/2 t2) | -Vp2 (1/2 t2) | |
| Clock synchronization cosinusoidal sawtooth wave (Number 0) | -Vp1 (1/2 t2) | -Vp2 (1/2 t2) | Vp1 (1/2 t2) | Vp2 (1/2 t2) | |

FIG. 4B

CHIP COMMUNICATION CIRCUIT, METHOD, AND APPARATUS BASED ON AUTOMATIC CLOCK SYNCHRONIZATION

CROSS-REFERENCE TO RELATED APPLICATIONS

This application claims priority to Chinese Patent Application No. 202310887345.2, filed on Jul. 18, 2023 and entitled "CHIP COMMUNICATION CIRCUIT, METHOD, AND APPARATUS BASED ON AUTOMATIC CLOCK SYNCHRONIZATION", which is hereby incorporated by reference in its entirety.

TECHNICAL FIELD

The present application relates to communication technology and, in particular, to a chip communication circuit, method, and apparatus based on automatic clock synchronization.

BACKGROUND

Existing daisy chain communication technology solutions are all achieved through converting universal serial communication into isolated serial communication of differential signals. For example, there are mainly two types: one is converting into isolated serial communication of differential signals by a universal asynchronous receiver/transmitter UART, and the other one is converting into isolated serial communication of differential signals by a serial peripheral interface SPI.

Since the entire communication process involves a microcontroller MCU sending data to battery management chips AFEs, the communication process is mainly divided into two modes: a read mode and a write mode. However, read and the write cannot occur simultaneously on the daisy chain, and data needs to be written first before being read.

However, the existing daisy chain communication methods have high communication power consumption and unsynchronized clocks among battery management chips, and cannot take into account both communication anti-interference and signal recognition.

SUMMARY

The present application provides a chip communication circuit, method, and apparatus based on automatic clock synchronization, to solve the problem of high communication power consumption and unsynchronized clocks among battery management chips in existing daisy chain communication methods, and achieve the technical effect of reducing the power consumption of the daisy chain communication, maintaining the clock synchronization of battery management chips, and taking into account both communication anti-interference and signal recognition.

In an aspect, the present application provides a chip communication method based on automatic clock synchronization, including:
  determining clock synchronization information of a first battery management chip in response to a received control instruction, where the control instruction is sent by a controller to the first battery management chip among multiple battery management chips through a serial peripheral interface;
  replacing a chip selection enable signal in the control instruction with a clock synchronization signal carrying the clock synchronization information of the first battery management chip to obtain a new control instruction; and
  transmitting the new control instruction to other battery management chips, so that the other battery management chips perform automatic clock synchronization based on the clock synchronization information carried in the new control instruction; where the other battery management chips are battery management chips among the multiple battery management chips except for the first battery management chip, and a daisy chain with a sinusoidal sawtooth waveform is used for isolated communication between different battery management chips.

In an optional implementation, the method further includes:
  at initialization of each of the multiple battery management chips, configuring a scheduler mode parameter of the battery management chip, where the scheduler mode parameter includes at least one of: a balancing start time, a settling time after balancing, a preparation time before self-diagnosis of a balancing circuit, a preparation time before open wire self-diagnosis of a battery collection wire, and a time required for collecting battery voltage or temperature;
  in response to a scheduler mode start instruction received by the battery management chip, executing a communication task in a cyclic manner according to the scheduler mode parameter.

In another aspect, the present application provides a chip communication circuit based on automatic clock synchronization, including:
  a controller, configured to send a control instruction; and
  multiple battery management chips, including: a first battery management chip and other battery management chips except for the first battery management chip, where the first battery management chip is connected to the controller through a serial peripheral interface, and a daisy chain with a sinusoidal sawtooth waveform is used for isolated communication between different battery management chips;
  where the first battery management chip is configured to: determine clock synchronization information of the first battery management chip in response to the received control instruction; replace a chip selection enable signal in the control instruction with a clock synchronization signal carrying the clock synchronization information of the first battery management chip to obtain a new control instruction; and transmit the new control instruction to other battery management chips, so that the other battery management chips perform automatic clock synchronization based on the clock synchronization information carried in the new control instruction.

In an optional implementation, at initialization of each of the multiple battery management chips, the controller is further configured to configure a scheduler mode parameter of the battery management chip, and send a scheduler mode start instruction to the battery management chip to control the battery management chip to execute a communication task in a cyclic manner according to the scheduler mode parameter, where the scheduler mode parameter includes at least one of: a balancing start time, a settling time after balancing, a preparation time before self-diagnosis of a balancing circuit, a preparation time before open wire self-diagnosis of a battery collection wire, and a time required for collecting battery voltage or temperature.

In an optional implementation, the other battery management chips are further configured to determine whether the clock synchronization information carried in the new control instruction is the same as clock information of the other battery management chips each time the new control instruction is received; and calibrate the clock information of the other battery management chips based on the clock synchronization information to perform automatic clock synchronization if it is determined that the clock synchronization information is different from the clock information of the other battery management chips.

In an optional implementation, the other battery management chips are further configured to determine whether the clock synchronization information carried in at least two new control instructions is the same when receiving the at least two new control instructions; and calibrate clock information of the other battery management chips based on the last received clock synchronization information to perform automatic clock synchronization if it is determined that the clock synchronization information carried in the at least two new control instructions is different.

In another aspect, the present application provides a chip communication apparatus based on automatic clock synchronization, including:
  a determination module, configured to determine clock synchronization information of a first battery management chip in response to a received control instruction, where the control instruction is sent by a controller to the first battery management chip among multiple battery management chips through a serial peripheral interface;
  a replacement module, configured to replace a chip selection enable signal in the control instruction with a clock synchronization signal carrying the clock synchronization information of the first battery management chip to obtain a new control instruction; and
  a synchronization module, configured to transmit the new control instruction to other battery management chips, so that the other battery management chips perform automatic clock synchronization based on the clock synchronization information carried in the new control instruction; where the other battery management chips are battery management chips among the multiple battery management chips except for the first battery management chip, and a daisy chain with a sinusoidal sawtooth waveform is used for isolated communication between different battery management chips.

In another aspect, the present application provides an electronic device including: a processor, and a memory connected to the processor; the memory stores computer execution instructions; and the processor executes the computer execution instructions stored in the memory to implement the method as described above.

In another aspect, the present application provides a computer-readable storage medium storing computer execution instructions, where when the computer execution instructions are used to implement the method as described above when executed by a processor.

In another aspect, the present application provides a computer program product including a computer program, where the computer program implements the method as described above when executed by a processor.

In the chip communication circuit, method, and apparatus based on automatic clock synchronization provided in the present application, as the control instruction is sent by the controller to the first battery management chip among the multiple battery management chips through a serial peripheral interface, that is, the communication between the controller and the first battery management chip is achieved through the serial peripheral interface, the other battery management chips are battery management chips among the multiple battery management chips except for the first battery management chip, and a daisy chain with a sinusoidal sawtooth waveform is used for isolated communication between different battery management chips. Furthermore, clock synchronization information of the first battery management chip is determined in response to a received control instruction; a chip selection enable signal in the control instruction is replaced with a clock synchronization signal carrying the clock synchronization information of the first battery management chip to obtain a new control instruction; and the new control instruction is transmitted to other battery management chips, so that the other battery management chips perform automatic clock synchronization based on the clock synchronization information carried in the new control instruction.

Therefore, in the embodiments of the present application, communication between the controller and the first battery management chip is performed using a serial peripheral interface, and isolated communication between different battery management chips is performed using a daisy chain with a sinusoidal sawtooth waveform. The first battery management chip determines the current clock synchronization information after receiving the control instruction, and then replaces the chip selection enable signal in the control instruction with a clock synchronization signal carrying the clock synchronization information to obtain the new control instruction, which can assist the other battery management chips in performing automatic clock synchronization based on the above clock synchronization information carried in the new control instruction. Moreover, isolated communication is performed between different battery management chips, and the daisy chain used is with a sinusoidal sawtooth wave, which has the advantages of strong signal anti-interference and easy recognition. It can solve the problem of high communication power consumption and unsynchronized clocks among battery management chips in existing daisy chain communication methods, and achieve the technical effect of reducing the power consumption of the daisy chain communication, maintaining the clock synchronization of battery management chips, and taking into consideration both communication anti-interference and signal recognition.

BRIEF DESCRIPTION OF DRAWINGS

The drawings here are incorporated into the specification and form a part of the specification, illustrating embodiments in accordance with the present application and used together with the specification to explain the principles of the present application.

FIG. 4B shows a corresponding relationship between a pulse, a level, and a waveform in FIG. 4A;

Figure 1:
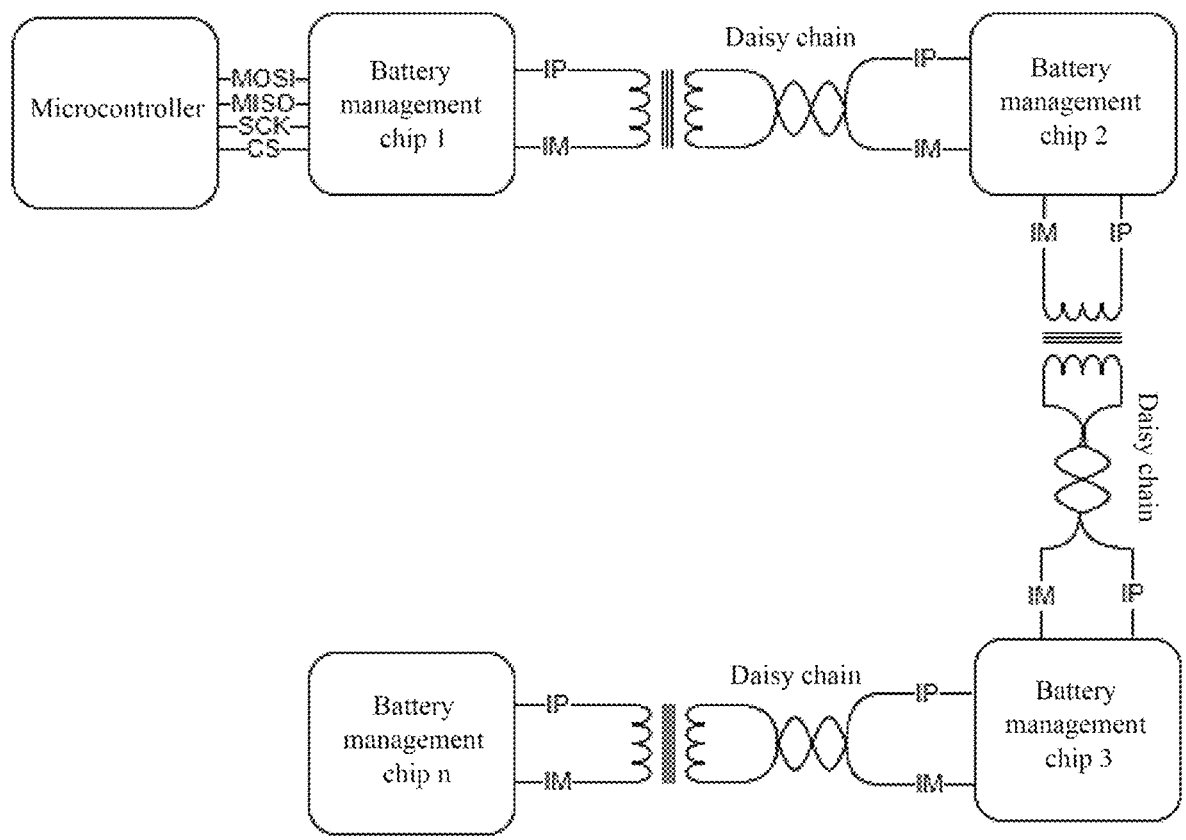
FIG. 1 is a schematic diagram of an architecture of a chip communication circuit based on automatic clock synchronization provided in an embodiment of the present application.

Through the above drawings, clear embodiments of the present application have been shown, and more detailed descriptions will be provided in the following. These drawings and textual descriptions illustrate the concept of the present application to those skilled in the art by referring to specific embodiments, rather than limiting the scope of the concept of the present application in any way.

DESCRIPTION OF EMBODIMENTS

Here, illustrative embodiments will be described in detail, which are illustrated in the accompanying drawings. When the following description involves drawings, the same numbers in different drawings represent the same or similar elements unless otherwise specified. The embodiments described in the following illustrative embodiments do not represent all embodiments consistent with the present application. On the contrary, they are only examples of apparatus and methods consistent with some aspects of the present application as detailed in the attached claims.

Firstly, terms involved in the present application is explained:

The daisy chain communication mode, refers to that a serial communication network connects like a daisy chain, hence called a daisy chain.

Battery management system (BMS): commonly known as a battery nanny or a battery manager, which is primarily designed to intelligently manage and maintain various battery units, to prevent over charging and over discharging, extend battery life, and monitor battery status.

Battery main control unit (BMU): a core component of the battery management system, which has the function of detecting voltage of N series lithium batteries, detecting battery temperature and automatically balancing battery power, and provides an isolated CAN communication interface, and provides information of voltage, temperature, monitoring and alarm to the BMS.

Battery slave control unit (CSC): a monitor installed on a cell, used for collecting information of this battery series and transmitting the information to the BMU for processing.

Bus extender (GENERAL PURPOSE INPUT OUTPUT, GPIO): referring to an expansion of an IO port simplified by using an industry standard I2C, SMBUS, or SPI interface. When a microcontroller unit or a chipset does not have sufficient IO ports, or when the system requires remote serial communication or control, a GPIO product may provide additional control and monitoring functions.

Battery management chip (Analog Front End, AFE): also known as a simulator front end, used in the new energy industry to collect voltage and temperature of a battery module and perform battery balancing, thereby achieving functions such as battery collection wire disconnection diagnosis and balancing circuit diagnosis.

Scheduler mode (Scheduler Mode): referring to a scheduler mode of a simulation front end, which completes voltage and temperature collection, balance control, and diagnostic function of a battery module according to a specific rule.

Serial peripheral interface (SPI): a synchronous serial communication interface specification used for chip communication.

Master in slave out (Master In Slave Out, MISO): an antenna technology used for wireless communication, such as, in the serial peripheral interface SPI, it is a channel signal from a slave to a master to send an instruction or data.

Master out slave in (Master Out Slave In, MOSI): a channel signal from a master to a slave to send an instruction or data.

Differential line: referring to a signal transmission technique, the differential line should refer to a differential wiring for differential signals, two parallel and equal-length wires are used to transmit the same signals with a phase difference of 180 degrees. These two signals have the same amplitude but opposite phases. The signals transmitted on these two wires are differential signals.

Universal asynchronous receiver/transmitter (Universal Asynchronous Receiver/Transmitter), commonly known as UART, is an asynchronous receiver/transmitter which is a part of computer hardware. It will convert data to be transmitted between serial communication and parallel communication. As a chip that converts parallel input signals into serial output signals, the UART is usually integrated into connections of other communication interfaces.

Existing technical solutions for daisy chain communication are all achieved through converting universal serial communication into isolated serial communication of differential signals. For example, there are mainly two types: one is to use a universal asynchronous receiver/transmitter UART for conversion to isolated serial communication of differential signals, and the other one is to use a serial peripheral interface SPI for conversion to isolated serial communication of differential signals.

In the first type, a battery main control unit BMU sends and receive data through a serial port, in an asynchronous communication mode, and after the microcontroller unit MCU sends data, a battery management chip AFE converts serial signals into differential signals designed for a daisy chain. The differential signals will be transmitted step by step through AFEs, when the differential signals reach a last AFE, the last AFE sends data that the MCU needs to read to a previous AFE, which is then transmitted step by step to a first AFE. The first AFE receives the data, converts the data into serial communication, and sends to the MCU.

In the second type, communicating is through a SPI, with a MCU as a master and an AFE as a slave. The communication process strictly follows SPI timing. An AFE will transmit data to the MCU at a next SPI clock signal (SCK) after the MCU completes sending. The waveform on the daisy chain is specially designed to convert 4-wire SPI signals into 2-wire differential signals for transmission. In order to meet the SPI timing between the MCU and the first AFE or Transfer, this type will design a baud rate of the daisy chain to be twice the SPI baud rate.

In order to solve the above problems, in embodiments of the present application, a configurable automatic scheduler system is added for the battery management chip, through the multi-chip clock self-synchronization technology, a daisy chain physical layer solution of multi-chip clock self-synchronization technology is implemented.

In embodiments of the present application, a configurable automatic scheduler system (scheduler system) is added on the basis of the traditional battery management chip AFE. In this mode, the scheduler may automatically schedule functions, such as, voltage collection, temperature collection, bus extender GPIO configuration, balance enabling, balance disabling, and fault diagnosis, and etc. Among them, the controller MCU needs to first configure the scheduler system, and then turn on the scheduler system. Since there may be various combinations of constituent units and specific timing in scheduling, the present application only uses a following combination as an example. However, the method in the embodiments of the present application may be applied to all other automatic scheduler systems.

Embodiment 1

Below are specific embodiments to provide a detailed explanation of the technical solution of the present application and how the technical solution of the present application solves the above-mentioned technical problems. The following specific embodiments can be combined with each other, and similar concepts or processes may not be repeated in some embodiments. The following will describe the embodiments of the present application with reference to the accompanying drawings.

The chip communication method based on automatic clock synchronization provided in the present application aims to solve the above-mentioned technical problems of the existing technology. This chip communication method based on automatic clock synchronization may be applied to the schematic diagram of an architecture of a chip communication circuit based on automatic clock synchronization shown in FIG. 1. As shown in FIG. 1, the chip communication circuit based on automatic clock synchronization includes:

a controller (a microcontroller as shown in FIG. 1), configured to send a control instruction.

Optionally, the above control instruction is an ISO-SPI instruction, which is a read or write register instruction sent to the battery management chip AFE. For example, the control instruction may be a voltage collection instruction, a read sampling result instruction, a balance instruction, a balance stop instruction, and so on.

In an optional embodiment, for example, when the MCU needs to read cell voltage data, the MCU sends a voltage collection instruction the AFE and waits for the AFE to complete sampling, and sends a read sampling result instruction to the AFE to read a corresponding result. For another example, the MCU sends a balance instruction, and the AFE performs balancing; the MCU sends a balance stop instruction, and the AFE stops balancing. In addition, the fault diagnosis function also has the same mechanism, the entire process is controlled by the MCU as a scheduling role to stop and start an AFE function.

Multiple battery management chips (battery management chip 1, battery management chip 2, battery management chip 3 . . . , battery management chip n), including: a first battery management chip 1 and other battery management chips except for the first battery management chip (such as, battery management chip 2, battery management chip 3 . . . , battery management chip n, etc.), where the first battery management chip is connected to the above controller through a serial peripheral interface, and a daisy chain with a sinusoidal sawtooth waveform is used for isolated communication between different battery management chips.

The above first battery management chip is configured to determine clock synchronization information of the first battery management chip in response to the above received control instruction; replace a chip selection enable signal in the above control instruction with a clock synchronization signal carrying the clock synchronization information of the first battery management chip, to obtain a new control instruction (where other data in the original control instruction remains unchanged), and transmit the new control instruction to a subsequent battery management chip. The subsequent battery management chip obtains clock synchronization information from the clock synchronization signal (also known as a synchronization signal) and obtains control information from other data. By transmitting the above new control instruction to other battery management chips, the other battery management chips may perform automatic clock synchronization based on the clock synchronization information carried in the above new control instruction.

FIG. 1 shows a microcontroller unit MCU and multiple battery management chips AFEs, and hardware connection interfaces between the first battery management chip AFE1 and other subsequent battery management chips AFEs. The connection method of the entire system is that the microcontroller unit MCU communicates with the first battery management chip AFE1 through a SPI, and the first battery management chip AFE1 and a second battery management chip AFE2, as well as all subsequent battery management chips, perform isolated communication using a daisy chain with a sinusoidal sawtooth waveform.

In an optional embodiment, each battery management chip AFE typically includes an ADC sampling module, a balance control module, a fault diagnosis module, a register module, and a data storage module. The ADC sampling module is mainly configured to perform voltage sampling for a cell, temperature sampling for a cell, total voltage sampling for a battery pack; the balance control module is used for active and passive balance control; the fault diagnosis module is used for fault diagnosis such as detecting a voltage collection line disconnection, a balance line disconnection, a battery over protection, etc.; the register module is configured to configure the AFE; and the data storage module is configured to store sampling results and system status information.

Figure 2:
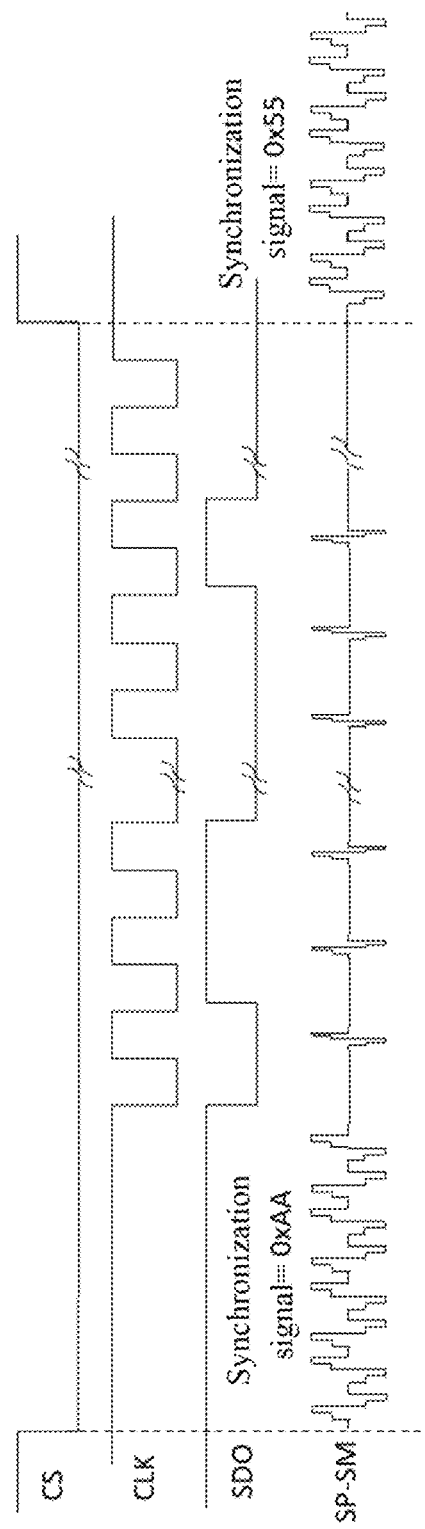
FIG. 2 is a schematic diagram of a writing position of a type of optional clock synchronization information provided in an embodiment of the present application.

In the present embodiment, the first battery management chip among the multiple battery management chips, upon receiving a control instruction sent by the controller MCU, analyzes the control instruction to determine a chip selection enable signal in the control instruction, determines a waveform of the chip selection enable signal CS as shown in FIG. 2, replaces the chip selection enable signal with clock synchronization information, which is automatically generated by the first battery management chip connected to the MCU, in a form of a clock synchronization signal according to falling and rising edges of the waveform of the chip selection enable signal, and transmits the new control instruction to other battery management chips among the multiple battery management chips through a daisy chain with a sinusoidal sawtooth waveform until it is transmitted to a last battery management chip. In this way, automatic timing synchronization can be achieved among multiple battery management chips.

In the embodiment of the present application, isolated communication is performed between different battery management chips, and the daisy chain used is with a sinusoidal sawtooth wave, which has the advantages of strong signal anti-interference and easy recognition.

In an optional implementation, at initialization of each of the multiple battery management chips, the above controller is also configured to configure a scheduler mode parameter of the battery management chip and send a scheduler mode start instruction to the battery management chip, to control the above battery management chip to execute a communication task in a cyclic manner according to the above scheduler mode parameter.

In an example, the above scheduler mode parameter includes at least one of the following: a balancing start time, a settling time after equalizing, a preparation time before self-diagnosis of a balance circuit, a preparation time before open wire self-diagnosis of a battery collection wire, and a time required for collecting battery voltage or temperature.

In an embodiment of the present application, during the initialization of the battery management chip, scheduler mode parameters for voltage collection, temperature collection, GPIO configuration, passive balance, and fault diagnosis may be configured, and the battery management chip may be caused, by a simplified instruction, to collect data according to a configured mode.

Figure 3:
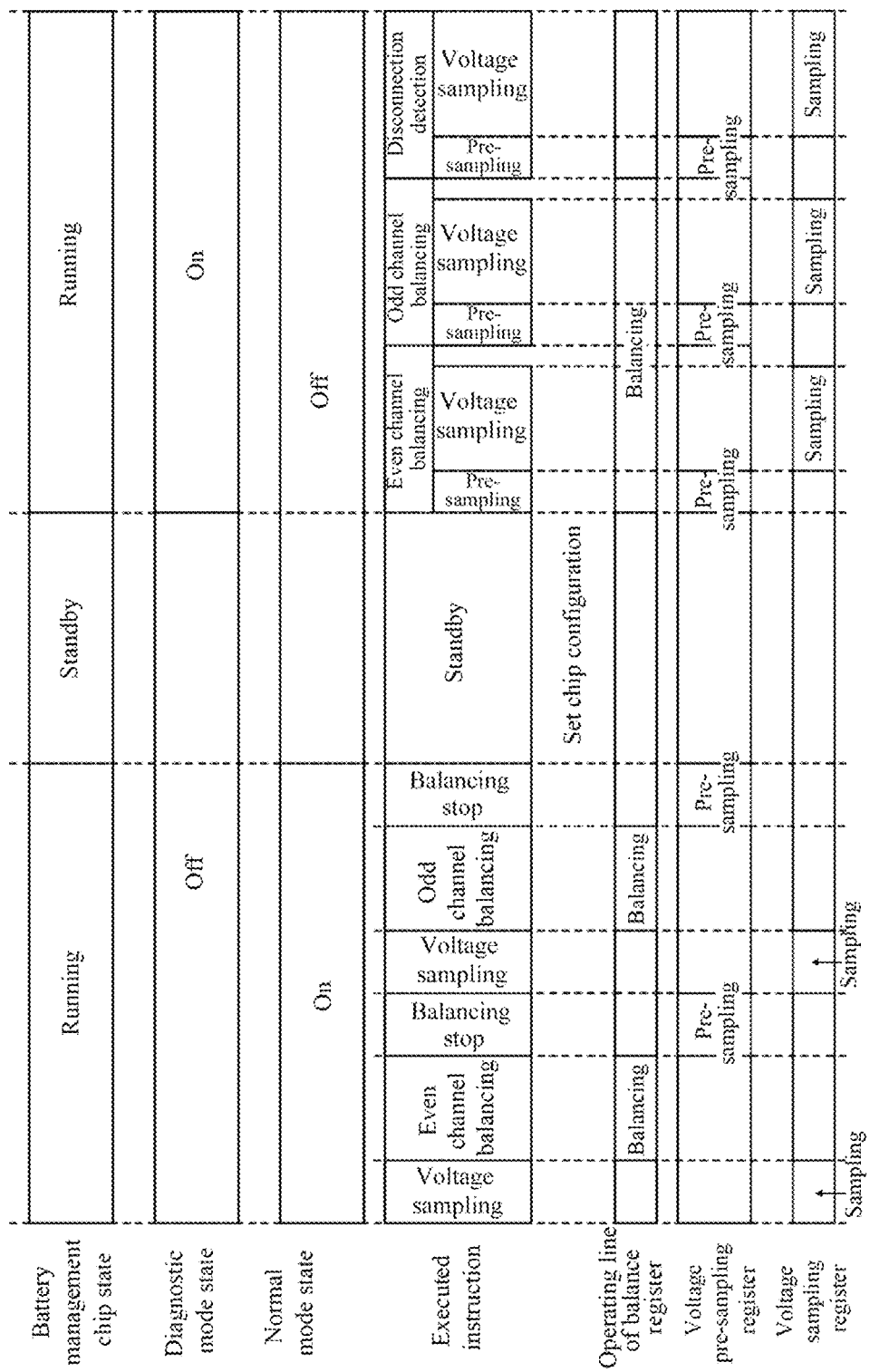
FIG. 3 is an operation timing diagram of an optional scheduler mode provided in an embodiment of the present application.

FIG. 3 shows an optional operation timing diagram of a scheduler mode, which has been optimized and designed according to an actual operating condition to reduce power consumption of communication between battery management chips. As shown in FIG. 3, battery management chip states of the battery management chip include a running state and a standby state, and diagnostic mode states of the battery management chip include an on state and an off state; normal mode states of the battery management chip includes an on state and an off state. In FIG. 3, commands executed by the battery management chip in the running state include but are not limited to: voltage sampling, even channel balance, balancing stop, voltage sampling, odd channel balancing, balancing stop, etc. After a standby state, the commands executed by the battery management chip in the running state may further include but are not limited to: even channel balancing (pre-sampling, voltage sampling), odd channel balancing (pre-sampling, voltage sampling), and disconnection detection (pre-sampling, voltage sampling). As shown in FIG. 3, after chip configuration is set, an operating line of a balance register may be sampled and a corresponding balance processing instruction may be executed. Afterwards, a voltage pre-sampling register is sampled and a corresponding balancing stop instruction is executed, and a voltage sampling register may be sampled and a corresponding sampling instruction may be executed.

In an example, after the above scheduler mode parameters are set, the MCU sends a scheduler mode (scheduler system) start instruction, and the battery management chip may execute in a cyclic manner according to a scheduler cycle based on a time configured by the initialization parameters. Voltage information and temperature information collected in each stage are automatically stored in a register. For example, voltage information and temperature information in the normal collection mode may be stored, voltage information in a self-diagnosis process of a balancing circuit may be stored, which is a data source for realizing the diagnostic function; and voltage information in an open wire self-diagnosis process of a battery collection wire (a data source for realizing the diagnostic function) may be stored. In an embodiment of the present application, during the initialization of the battery management chip, functional parameters for voltage collection, temperature collection, GPIO configuration, passive balance, fault diagnosis, and the like are configured. Then, the battery management chip may be caused, by a simplified instruction, to collect data according to the configured mode. Compared to the MCU sending the above instructions separately to achieve these functions, it saves 60% of communication messages and can save 60% of communication power consumption.

In the embodiment of the present application, the MCU adopts more simplified instructions to achieve battery voltage collection, temperature collection, passive balance, and diagnostic function, reducing the quantity of instructions sent via MCU messages and thereby reducing 60% of communication power consumption. By using multi-chip clock self-synchronization technology, the synchronization of all battery collection can be guaranteed to be less than 1 ms (assuming that the MCU sends an instruction to the battery management chips at least once every 1 s); moreover, in the solution of the present application, isolated communication is performed between different battery management chips, and the daisy chain used is with a sinusoidal sawtooth wave, which has the advantages of strong signal anti-interference and easy recognition.

In an optional embodiment, each battery unit has multiple battery slave control units CSC to monitor voltage information and temperature information of each cell or each battery pack; the CSC may also report collected relevant information to the battery control unit BMU, and then perform cell voltage balancing according to an instruction of the BMU.

In an optional embodiment, the other battery management chips are further configured to determine whether the clock synchronization information carried in the new control instruction is the same as their own clock information each time the new control instruction is received; and calibrate their own clock information based on the clock synchronization information to perform automatic clock synchronization if it is determined that the clock synchronization information is different from their own clock information.

In another optional embodiment, the other battery management chips are further configured to determine whether the clock synchronization information carried in at least two new control instructions is the same when receiving the at least two new control instructions; and calibrate their own clock information based on the last received clock synchronization information to perform automatic clock synchronization if it is determined that the clock synchronization information carried in the at least two new control instructions is different.

In the daisy-chain communication mode with automatic clock synchronization provided in the embodiment of the present application, the controller MCU can adopt more simplified instructions to control the battery management chips to achieve battery voltage collection, temperature collection, passive balance, and diagnostic function, the synchronization of all battery collection may be guaranteed to be less than 1 ms (assuming that the MCU sends control instructions to the battery management chip with a maximum interval of 1 second), thereby reducing the quantity of control instructions sent via MCU messages, and reducing 60% of communication power consumption.

In an optional embodiment, in the daisy chain communication technology of the embodiment of the present application, a timing self-synchronization design is added. After the first battery management chip receives a control instruction from the controller, a data parser in the first battery management chip may analyze the control instruction to determine a chip selection enable signal in the control instruction, determine a waveform of the chip selection enable signal CS as shown in FIG. 2, and replace the chip selection enable signal with the clock synchronization information, which is automatically generated by the first battery management chip connected to the MCU, in a form of a clock synchronization signal based on the falling and rising edges of the waveform, including but not limited to positions 0xAA and 0x55 (0xAA and 0x55 are merely taken as examples) as shown in FIG. 2, to obtain a new control instruction.

Figure 4A:
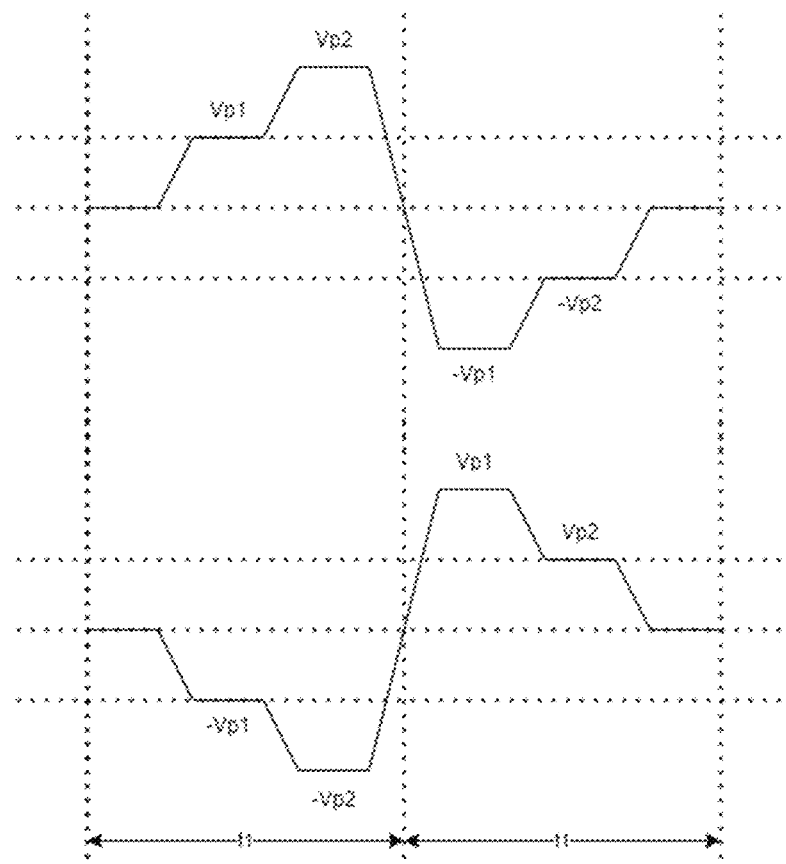
FIG. 4A is a waveform diagram of an optional sinusoidal sawtooth waveform provided in an embodiment of the present application.

In an embodiment of the present application, a daisy chain with a sinusoidal sawtooth waveform is used for isolated communication between different battery management chips. In an example, a waveform of the sinusoidal sawtooth waveform is shown in FIG. 4A, and a corresponding relationship between a pulse, a level, and a waveform in FIG. 4A is shown in FIG. 4B. [For] As show in FIG. 4B, for a design of the voltage, $Vp2=2*Vp1$, and for a design of time, $t2=2*t1$.

Figure 5:
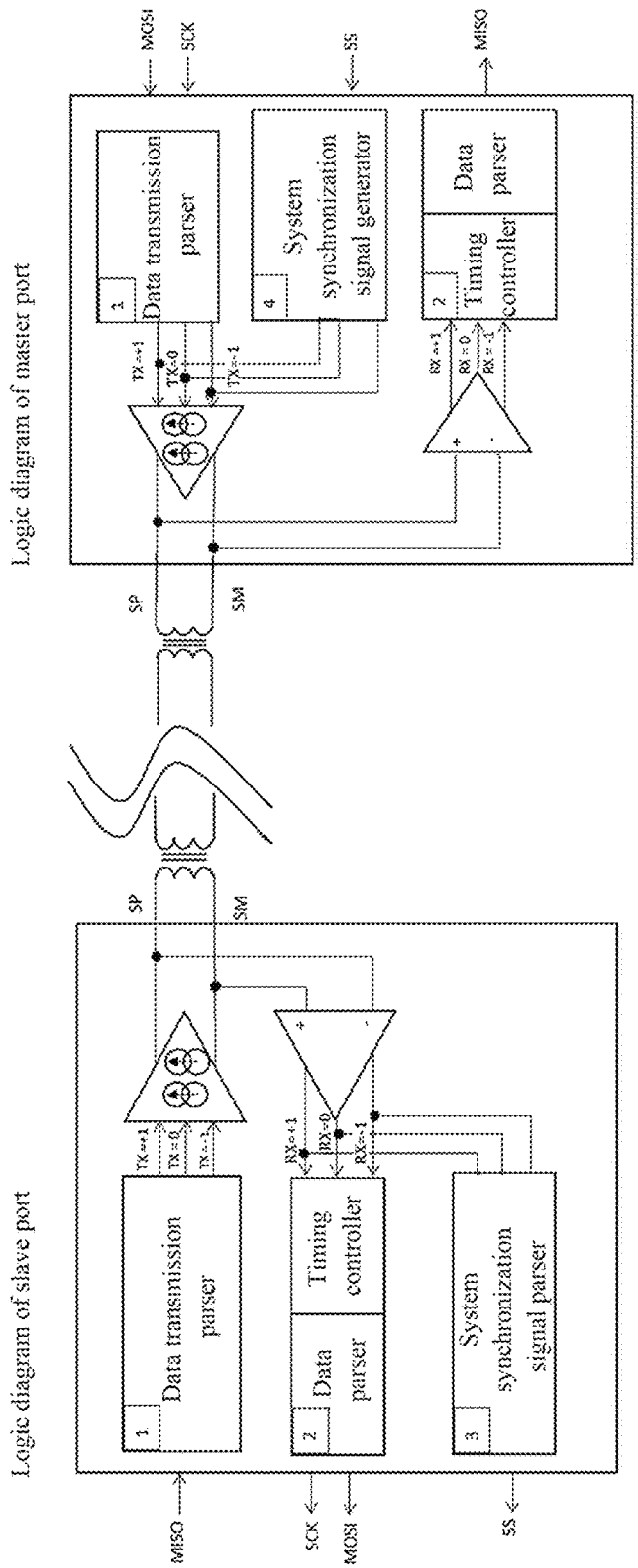
FIG. 5 is a schematic circuit diagram of a connection relationship between a controller and a first battery management chip provided in an embodiment of the present application.

In an optional embodiment, as shown in FIG. 5, an optional schematic circuit diagram is used to display a connection relationship between a controller and a first battery management chip. In an embodiment of the present application, the controller MCU is used as a master station (a master), and the battery management chip is used as a slave station (a slave). Among them, the SPI is a serial peripheral interface, the MISO is a master-in-slave-out signal line of the SPI, and MOSI is a master-out-slave-in signal line of the SPI; the SCK is a clock signal line of the SPI, and the CS is a chip selection enable line of the SPI; the TX represents sending, the RX represents receiving; the SP is a high-end of a daisy chain differential communication, the SM is a low-end of the daisy chain differential communication, and the SS is a CS signal of the SPI.

As shown in FIG. 5, the controller and the first battery management chip respectively include a data transmission parser, a two-stage parallel current generator, a data parser, and a timing controller. Among them, the data transmission parser is configured to convert a data bit 0 or 1 into a three-level sawtooth pulse with a half pulse width of t1; the two-stage parallel current generator is configured to generate a three-level 0V, Vp1, and Vp2 sawtooth waveforms; the data parser is configured to detect pulses with a pulse width of t1 received from a main port and timing controller, and trigger a comparator to compare an input voltage with two reference voltages Vp1 and Vp2 to determine whether it is data 0 or 1; and the timing controller is configured to control timing synchronization between multiple battery management chips.

In addition, the master station, i.e., the controller, includes a system synchronization signal generator, which is configured to fill front and back ends of the data area with a 16 bit synchronous clock synchronization signal and send to a port of the slave stations. Among them, each data bit has a half pulse width of t2, and it uses a two-stage current generator to generate a three-level sawtooth waveform for modulating data bits.

The slave station, i.e. the battery management chip, includes a system synchronization signal parser, configured to detect pulses with a pulse width of t2 received from the master station port and the timing controller, and if the t2 half pulse width is found, trigger a 2-level voltage comparator to determine whether the data is 0 or 1.

A traditional MCU controls the battery management chips by sending relevant instructions such as voltage collection, temperature collection, GPIO configuration, balance enabling, balance disabling, fault diagnosis control, etc., via messages. There are many instructions to control the battery management chips. In the embodiments of the present application, by configuring the automatic scheduler function parameter, these instructions can be simplified. The MCU only configures the scheduler function parameters of these functions during initialization, presets behaviors and timing of these scheduling function parameters, and only periodically reads data stored in the battery management chip.

In the embodiment of the present application, the MCU adopts more simplified instructions to achieve battery voltage collection, temperature collection, passive balance, and diagnostic function, reducing the quantity of instructions sent via MCU messages and thereby reducing 60% of communication power consumption. By using multi-chip clock self-synchronization technology, the synchronization of all battery collection may be guaranteed to be less than 1 ms (assuming that the MCU sends an instruction to the battery management chips at least once every 1 s); moreover, in the present application, isolated communication is performed between different battery management chips, and the daisy chain used is with a sinusoidal sawtooth wave, which has the advantages of strong signal anti-interference and easy recognition.

Embodiment 2

Figure 6:
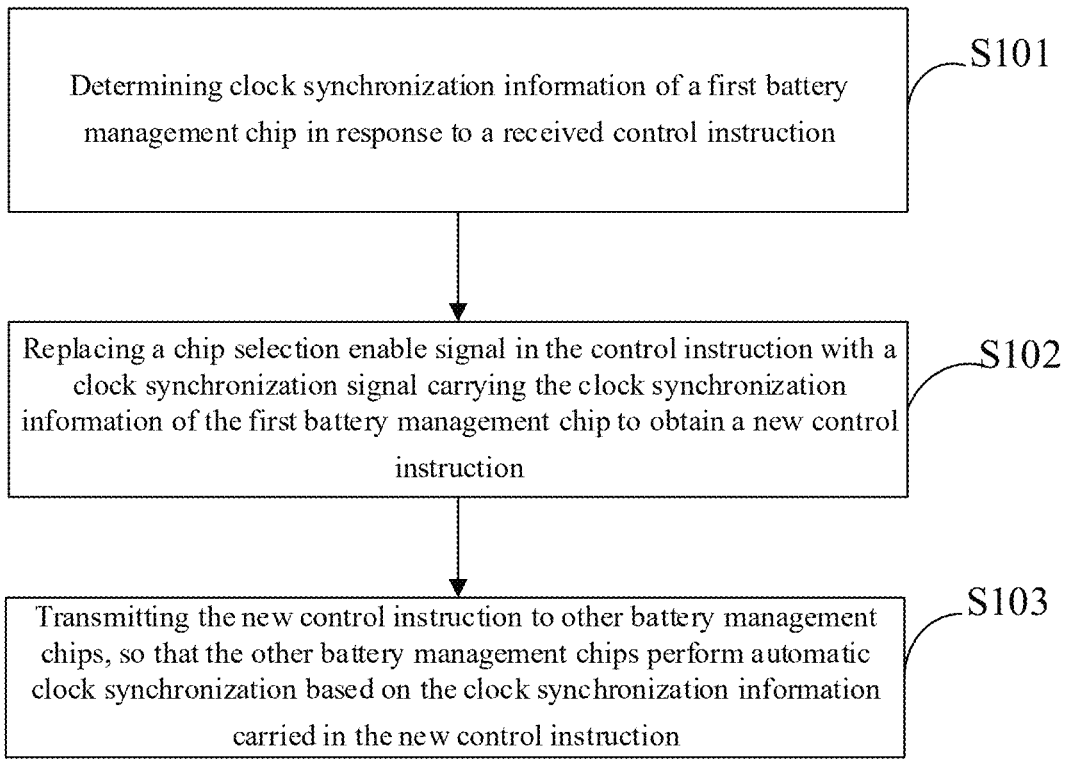
FIG. 6 is a schematic flowchart of a chip communication method based on automatic clock synchronization provided in an embodiment of the present application.

An embodiment of the present application further proposes an embodiment of a chip communication method based on automatic clock synchronization. FIG. 6 is a flowchart of a chip communication method based on automatic clock synchronization provided in an embodiment of the present application. As shown in FIG. 6, the method includes:

S101, determining clock synchronization information of a first battery management chip in response to a received control instruction.

S102, replacing a chip selection enable signal in the control instruction with a clock synchronization signal carrying the clock synchronization information of the first battery management chip to obtain a new control instruction.

S103, transmitting the new control instruction to other battery management chips, so that the other battery management chips performs automatic clock synchronization based on the clock synchronization information carried in the new control instruction.

In an example, the control instruction is sent by a controller to the first battery management chip among multiple battery management chips through a serial peripheral interface, and a daisy chain with a sinusoidal sawtooth waveform is used for isolated communication between different battery management chips.

Optionally, the other battery management chips are battery management chips among the multiple battery management chips except for the first battery management chip.

Unlike traditional sine waves or square waves (although sine waves have slightly better anti-interference performance, they are not easy to be analyzed and recognized by chips, which can easily cause waveform misjudgment; and square waves are easy to be recognized but have poor anti-interference performance, and are prone to waveform distortion), in the embodiment of the present application, a daisy chain with a sinusoidal sawtooth waveform is used for isolated communication between different battery management chips, which not only has the advantages of strong anti-interference performance but also easy recognition, and thus has strong practical value and novelty.

In an embodiment of the present application, the first battery management chip among the multiple battery management chips, upon receiving a control instruction sent by the controller MCU, may add the clock synchronization information of the first battery management chip itself to the control instruction by replacing the chip selection enable signal CS in the control instruction, and transmit the new control instruction to the other battery management chips among the multiple battery management chips through a daisy chain until it is transmitted to the last battery management chip.

In the daisy chain communication technology of an embodiment of the present application, a timing self-synchronization design is added, which not only reduces the power consumption of the daisy chain communication, but also maintains the clock synchronization of the battery management chips, and achieves the technical effect of taking into consideration both communication anti-interference and signal recognition.

More importantly, isolated communication is performed between different battery management chips, and the daisy chain used is with a sinusoidal sawtooth wave, which has the advantages of strong signal anti-interference and easy recognition. It can solve the problem of high communication power consumption and unsynchronized clocks between battery management chips in existing daisy chain communication methods, and achieve the technical effect of reducing the power consumption of the daisy chain communication, maintaining the clock synchronization of the battery management chips, and taking into consideration both communication anti-interference and signal recognition.

In the embodiments of the present application, communication between the controller and the first battery management chip is performed using a serial peripheral interface, and isolated communication between different battery management chips is performed using a daisy chain with a sinusoidal sawtooth waveform. The first battery management chip determines the current clock synchronization information after receiving the control instruction, and then replaces the chip selection enable signal in the control instruction with a clock synchronization signal carrying the clock synchronization information to obtain the new control instruction, which can assist the other battery management chips in performing automatic clock synchronization based on the above clock synchronization information carried in the new control instruction. It can solve the problem of high communication power consumption and unsynchronized clocks among battery management chips in existing daisy chain communication methods, and achieve the technical effect of reducing the power consumption of the daisy chain communication, maintaining the clock synchronization of each battery management chip, and taking into consideration both communication anti-interference and signal recognition.

A traditional MCU controls the battery management chips by sending relevant instructions such as voltage collection, temperature collection, GPIO configuration, balance enabling, balance disabling, fault diagnosis control, etc., via messages. There are many instructions to control the battery management chip. In the embodiments of the present application, by configuring the automatic scheduler function parameters, these instructions can be simplified. The MCU only configures the scheduler function parameters of these functions during initialization, presets behaviors and timing of these scheduling function parameters, and only periodically reads data stored in the battery management chip.

In an optional implementation, before determining clock synchronization information of the first battery management chip in response to the received control instruction, the chip communication method based on automatic clock synchronization further includes the following method steps:

at initialization of each of the multiple battery management chips, configuring a scheduler mode parameter of the battery management chip; and in response to a scheduler mode start instruction received by the battery management chip, executing a communication task in a cyclic manner according to the scheduler mode parameter.

In an example, the above scheduler mode parameter includes at least one of the following: a balancing start time, a settling time after balancing, a preparation time before self-diagnosis of a balancing circuit, a preparation time before open wire self-diagnosis of a battery collection wire, and a time required for collecting battery voltage or temperature.

In an example, after setting the above scheduler mode parameter, the MCU sends a scheduler mode (scheduler system) start instruction, and the battery management chip executes in a cyclic manner according to a scheduler cycle based on a time configured by the initialization parameters. Voltage information and temperature information collected in each stage are automatically stored in a register. For example, voltage information and temperature information under a normal collection mode may be stored, voltage information in a self-diagnosis process of a balancing circuit (a data source for realizing the diagnostic function) may be stored. In an embodiment of the present application, during the initialization of the battery management chip, functional parameters for voltage collection, temperature collection, GPIO configuration, passive balance, fault diagnosis, and the like are configured. And the battery management chip may collect data according to the configured mode through simplified instructions. Compared to the MCU sending the above instructions separately to achieve these functions, it saves 60% of communication messages and can save 60% of communication power consumption.

In the embodiment of the present application, the MCU adopts more simplified instructions to achieve battery voltage collection, temperature collection, passive balance, and diagnostic function, reducing the quantity of instructions sent via MCU messages and thereby reducing 60% of communication power consumption. By using multi-chip clock self-synchronization technology, the synchronization of all battery collection may be guaranteed to be less than 1 ms (assuming that the MCU sends an instruction to the battery management chips at least once every 1 s); moreover, in the present application, isolated communication is performed between different battery management chips, and the daisy chain used is with a sinusoidal sawtooth wave, which has the advantages of strong signal anti-interference and easy recognition.

In an optional implementation, the other battery management chips perform automatic clock synchronization based on the clock synchronization information carried in the new control instruction, which includes:

the other battery management chips compare whether the clock synchronization information carried in the new control instruction is the same as their own clock information each time the new control instruction is received; and calibrate their own clock information based on the clock synchronization information to perform automatic clock synchronization if it is determined that the clock synchronization information is different from their own clock information.

In an optional embodiment, the other battery management chips compare whether the clock synchronization information carried in the new control instruction is the same as their own clock information each time the new control instruction is received; and calibrate their own clock information based on the clock synchronization information to perform automatic clock synchronization if it is determined that the clock synchronization information is different from their own clock information.

In an optional implementation, the above method further includes:
comparing whether the clock synchronization information carried in at least two new control instructions is the same when receiving the at least two new control instructions; and
calibrating their own clock information based on the last received clock synchronization information to perform automatic clock synchronization if it is determined that the clock synchronization information carried in the at least two new control instructions is different.

In another optional embodiment, the other battery management chips compare whether the clock synchronization information carried in at least two new control instructions is the same when receiving the at least two new control instructions; and calibrate their own clock information based on the last received clock synchronization information to perform automatic clock synchronization if it is determined that the clock synchronization information carried in the at least two new control instructions is different.

In the daisy-chain communication mode with automatic clock synchronization provided in the embodiment of the present application, the controller MCU adopts more simplified instructions to control the battery management chips to achieve functions of battery voltage collection, temperature collection, passive balance and diagnosis, the synchronization of all battery collection may be guaranteed to be less than 1 ms (assuming that the MCU sends control instructions to the battery management chip with a maximum interval of 1 second), thereby reducing the quantity of control instructions sent via MCU messages, and reducing 60% of communication power consumption.

It should be noted that, user information (including but not limited to user device information, user personal information, etc.) and data (including but not limited to data used for analysis, stored data, displayed data, etc.) involved in the present application are all information and data authorized by the user or fully authorized by all parties, and the collection, use, and processing of relevant data comply with relevant laws, regulations, and standards of relevant countries and regions. Corresponding operation entrances are provided for users to choose authorization or refusal.

Example 3

Figure 7:
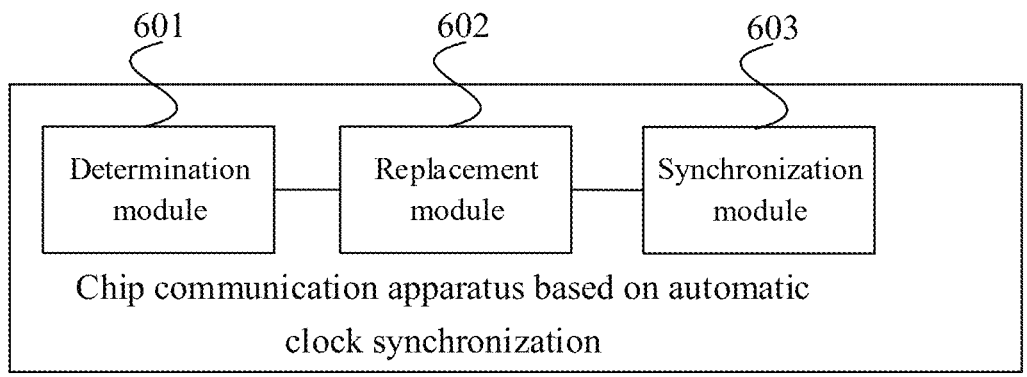
FIG. 7 is a structural diagram of a chip communication apparatus based on automatic clock synchronization provided in an embodiment of the present application.

According to one or more embodiments of the present application, a chip communication apparatus based on automatic clock synchronization is provided. FIG. 7 is a structural diagram of a chip communication apparatus based on automatic clock synchronization provided in an embodiment of the present application. As shown in FIG. 7, the apparatus includes:
a determination module 601, configured to determine clock synchronization information of a first battery management chip in response to a received control instruction, where the control instruction is sent by a controller to the first battery management chip among multiple battery management chips through a serial peripheral interface;
a replacement module 602, configured to replace a chip selection enable signal in the control instruction with a clock synchronization signal carrying the clock synchronization information of the first battery management chip to obtain a new control instruction; and
a synchronization module 603, configured to transmit the new control instruction to other battery management chips, so that the other battery management chips perform automatic clock synchronization based on the clock synchronization information carried in the new control instruction; where the other battery management chips are battery management chips among the multiple battery management chips except for the first battery management chip, and a daisy chain with a sinusoidal sawtooth waveform is used for isolated communication between different battery management chips.

According to one or more embodiments of the present application, the apparatus further includes:
a configuration module, configured to configure, at initialization of each of the multiple battery management chips, a scheduler mode parameter of the battery management chip, where the scheduler mode parameter includes at least one of: a balancing start time, a settling time after balancing, a preparation time before self-diagnosis of a balancing circuit, a preparation time before open wire self-diagnosis of a battery collection wire, and a time required for collecting battery voltage or temperature; and
an execution module, configured to execute, in response to a scheduler mode start instruction received by the battery management chip, a communication task in a cyclic manner according to the scheduler mode parameter.

According to one or more embodiments of the present application, the synchronization module includes:
a comparison unit, configured to compare whether the clock synchronization information carried in the new control instruction is the same as their own clock information each time the new control instruction is received by the other battery management chips; and
a synchronization unit, configured to calibrate their own clock information based on the clock synchronization information to perform automatic clock synchronization if it is determined that the clock synchronization information is different from their own clock information.

According to one or more embodiments of the present application, the apparatus further includes:
a comparison module, configured to compare whether the clock synchronization information carried in at least two new control instructions is the same when the other battery management chips receive the at least two new control instructions; and
a calibrated synchronization module, configured to calibrate their own clock information based on the last received clock synchronization information to perform automatic clock synchronization if it is determined that the clock synchronization information carried in the at least two new control instructions is different.

In an illustrative embodiment, the present application further provides an electronic device including: a processor and a memory connected to the processor;
where the memory stores computer execution instructions; and
the processor executes the computer execution instructions stored in the memory to implement any method as described above.

In an illustrative embodiment, the present application further provides a computer-readable storage medium storing computer execution instructions, where when the computer execution instructions are used to implement any method as described above when executed by a processor.

In an illustrative embodiment, the present application further provides a computer program product including a computer program, where the computer program implements any method as described above when executed by a processor.

Figure 8:
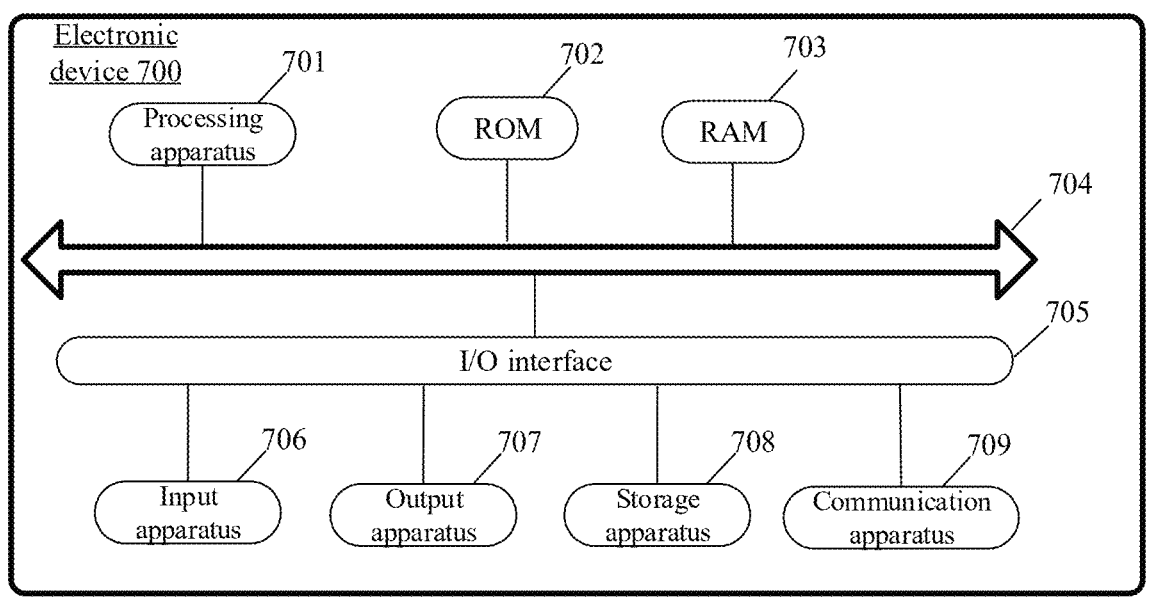
FIG. 8 is a structure schematic diagram of an electronic device provided in an embodiment of the present application.

In order to achieve the above embodiments, the present application further provides an electronic device. Referring to FIG. 8, a schematic diagram of the structure of an electronic device 700 suitable for implementing an embodiment of the present application is shown, which may be a terminal device or a server.

As shown in FIG. 8, the electronic device 700 may include a processing apparatus (such as, a central processing unit, a graphics processor, etc.) 701, and the processing apparatus 701 may perform various appropriate actions and processing according to a program stored in a read only memory (Read only memory, ROM) 702 or a program loaded from a storage apparatus 708 into a random access memory (Random access memory, RAM) 703. Various programs and data necessary for the operation of the electronic device 700 are also stored in the RAM 703. The processing apparatus 701, ROM 702, and RAM 703 are connected to each other through a bus 704. And an input/output (I/O) interface 705 is also connected to the bus 704

Generally, the following apparatuses may be connected to the I/O interface 705: an input apparatus 706 including, for example, a touch screen, a touchpad, a keyboard, a mouse, a camera, a microphone, an accelerometer, a gyroscope, etc.; an output apparatus 707 including, for example, a liquid crystal display (Liquid crystal display, LCD), a speaker, a vibrator, etc.; a storage apparatus 708 including, for example, a magnetic tape, a hard disk, etc.; and a communication apparatus 709. The communication apparatus 709 may allow the electronic device 700 to communicate wirelessly or by wire with other devices to exchange data. Although FIG. 8 shows the electronic device 700 having various apparatuses, it should be understood that not all of the illustrated apparatuses are required to be implemented or provided. More or fewer apparatuses may alternatively be implemented or provided.

Specially, according to an embodiment of the present application, the processes described above with reference to the flowcharts may be implemented as a computer software program. For example, an embodiment of the present application includes a computer program product including a computer program carried on a computer-readable medium, where the computer program includes program code for performing the method illustrated in the respective flowcharts. In such an embodiment, the computer program may be downloaded and installed from a network via the communication apparatus 709, or installed from the storage apparatus 708, or installed from the ROM 702. When the computer program is executed by the processing apparatus 701, the above functions defined in the embodiments of the present application are implemented.

It should be noted that the computer-readable medium described in the present application may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer-readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present application, the computer-readable storage medium may be any tangible medium that includes or stores a program that may be used by or used in combination with an instruction execution system, apparatus, or device. And in the present application, the computer-readable signal medium may include a data signal propagated in baseband or as part of a carrier wave, carrying computer-readable program code therein. Such propagated data signal may be in a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer-readable medium may be transmitted through any suitable medium including, but not limited to, an electrical wire, an optical fiber cable, a RF (Radio Frequency), etc., or any suitable combination thereof.

The computer-readable medium may be included in the above electronic device; and may also exist independently without being assembled into the electronic device.

The computer-readable medium carries one or more programs, and the one or more programs, when executed by the electronic device, cause the electronic device to execute the method shown in the above embodiments.

The computer program code for performing an operation of the present application may be written in one or more programming languages or a combination thereof, where the above programming languages include an object-oriented programming language, such as Java, Smalltalk, and C++, as well as a conventional procedural programming language, such as "C" language or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (Local Area Network, LAN) or a wide area network (Wide Area Network, WAN), or may be connected to an external computer (e.g., connected via the Internet using an Internet service provider).

The flowcharts and block diagrams in the figures illustrate the architecture, functionality, and operation of possible implementations of systems, methods and computer program products according to various embodiments of the present application. In this regard, each block in the flowcharts or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or be executed in a reverse order sometimes, depending on the functionality involved. It should also be noted that each block of the block diagrams and/or flowcharts, or a combination of blocks in the block diagrams and/or flowcharts may be implemented with a special-purposed hardware-based system that performs a specified function or operation, or may be implemented with a combination of special-purposed hardware and a computer instruction.

The involved units described in embodiments of the present application may be implemented by means of software, and may also be implemented by means of hardware. Names of these units do not constitute a limitation on the units per se under certain circumstances.

The foregoing functions described herein may be executed, at least in part, by one or more hardware logic components. For example, without limitation, exemplary types of hardware logic components that may be used include: a field programmable gate array (Field programmable gate array, FPGA), an application specific integrated circuit (Application specific integrated circuit, ASIC), an application specific standard product (Application specific standard parts, ASSP), a system on chip (System on chip, SOC), a complex programmable logical device (Complex programmable logic device, CPLD) and more.

In the context of the present application, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the foregoing. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optic fiber, a portable compact disk read only memory (CD-ROM), an optical storage device, a magnetic storage device, or any suitable combination of the foregoing.

The person skilled in the field will easily come up with other embodiments of the present application after considering the specification and practicing the invention disclosed herein. The present application aims to cover any variations, uses, or adaptive changes of the present application, which follow the general principles of the present application and include common knowledge or conventional technical means in the technical field not disclosed in the present application. The specification and embodiments are only considered illustrative, and the true scope and spirit of the present application are indicated in the following claims.

It should be understood that the present application is not limited to the precise structure described above and shown in the drawings, and various modifications and changes may be made without departing from its scope. The scope of the present application is limited only by the accompanying claims.

What is claimed is:

1. A chip communication circuit based on automatic clock synchronization, comprising:
    a controller, configured to send a control instruction; and
    multiple battery management chips, comprising: a first battery management chip and other battery management chips except for the first battery management chip, wherein the first battery management chip is connected to the controller through a serial peripheral interface, and a daisy chain with a sinusoidal sawtooth waveform is used for isolated communication between different battery management chips;
    wherein the first battery management chip is configured to: determine clock synchronization information of the first battery management chip in response to the received control instruction; replace a chip selection enable signal in the control instruction with a clock synchronization signal carrying the clock synchronization information of the first battery management chip to obtain a new control instruction; and transmit the new control instruction to other battery management chips, so that the other battery management chips perform automatic clock synchronization based on the clock synchronization information carried in the new control instruction.

2. The chip communication circuit according to claim 1, wherein
    at initialization of each of the multiple battery management chips, the controller is further configured to configure a scheduler mode parameter of the battery management chip, and send a scheduler mode start instruction to the battery management chip to control the battery management chip to execute a communication task in a cyclic manner according to the scheduler mode parameter, wherein the scheduler mode parameter comprises at least one of: a balancing start time, a settling time after balancing, a preparation time before self-diagnosis of a balancing circuit, a preparation time before open wire self-diagnosis of a battery collection wire, and a time required for collecting battery voltage or temperature.

3. The chip communication circuit according to claim 1, wherein
    the other battery management chips is further configured to determine whether the clock synchronization information carried in the new control instruction is the same as clock information of the other battery management chips each time the new control instruction is received; and calibrate the clock information of the other battery management chips based on the clock synchronization information to perform automatic clock synchronization if it is determined that the clock synchronization information is different from the clock information of the other battery management chips.

4. The chip communication circuit according to claim 2, wherein
    the other battery management chips is further configured to determine whether the clock synchronization information carried in the new control instruction is the same as clock information of the other battery management chips each time the new control instruction is received; and calibrate the clock information of the other battery management chips based on the clock synchronization information to perform automatic clock synchronization if it is determined that the clock synchronization information is different from the clock information of the other battery management chips.

5. The chip communication circuit according to claim 1, wherein
    the other battery management chips are further configured to determine whether the clock synchronization information carried in at least two new control instructions is the same when receiving the at least two new control instructions; and calibrate clock information of the other battery management chips based on the last received clock synchronization information to perform automatic clock synchronization if it is determined that the clock synchronization information carried in the at least two new control instructions is different.

6. The chip communication circuit according to claim 2, wherein
the other battery management chips are further configured to determine whether the clock synchronization information carried in at least two new control instructions is the same when receiving the at least two new control instructions; and calibrate clock information of the other battery management chips based on the last received clock synchronization information to perform automatic clock synchronization if it is determined that the clock synchronization information carried in the at least two new control instructions is different.

7. The chip communication circuit according to claim 3, wherein
the other battery management chips are further configured to determine whether the clock synchronization information carried in at least two new control instructions is the same when receiving the at least two new control instructions; and calibrate clock information of the other battery management chips based on the last received clock synchronization information to perform automatic clock synchronization if it is determined that the clock synchronization information carried in the at least two new control instructions is different.

8. The chip communication circuit according to claim 4, wherein
the other battery management chips are further configured to determine whether the clock synchronization information carried in at least two new control instructions is the same when receiving the at least two new control instructions; and calibrate clock information of the other battery management chips based on the last received clock synchronization information to perform automatic clock synchronization if it is determined that the clock synchronization information carried in the at least two new control instructions is different.

9. A chip communication method based on automatic clock synchronization, comprising:
determining clock synchronization information of a first battery management chip in response to a received control instruction, wherein the control instruction is sent by a controller to the first battery management chip among multiple battery management chips through a serial peripheral interface;
replacing a chip selection enable signal in the control instruction with a clock synchronization signal carrying the clock synchronization information of the first battery management chip to obtain a new control instruction; and
transmitting the new control instruction to other battery management chips, so that the other battery management chips perform automatic clock synchronization based on the clock synchronization information carried in the new control instruction; wherein the other battery management chips are battery management chips among the multiple battery management chips except for the first battery management chip, and a daisy chain with a sinusoidal sawtooth waveform is used for isolated communication between different battery management chips.

10. The method according to claim 9, further comprising:
at initialization of each of the multiple battery management chips, configuring a scheduler mode parameter of the battery management chip, wherein the scheduler mode parameter comprises at least one of: a balancing start time, a settling time after balancing, a preparation time before self-diagnosis of a balancing circuit, a preparation time before open wire self-diagnosis of a battery collection wire, and a time required for collecting battery voltage or temperature; and
in response to a scheduler mode start instruction received by the battery management chip, executing a communication task in a cyclic manner according to the scheduler mode parameter.

11. A non-transitory computer-readable storage medium storing computer execution instructions, wherein the computer execution instructions are used to implement the method according to claim 9 when executed by a processor.

12. A computer program product comprising a computer program, wherein the computer program implements the method according to claim 9 when executed by a processor.

13. An electronic device, comprising a processor and a memory connected to the processor;
wherein the memory stores computer execution instructions; and
the processor executes the computer execution instructions stored in the memory to:
determine clock synchronization information of a first battery management chip in response to a received control instruction, wherein the control instruction is sent by a controller to the first battery management chip among multiple battery management chips through a serial peripheral interface;
replace a chip selection enable signal in the control instruction with a clock synchronization signal carrying the clock synchronization information of the first battery management chip to obtain a new control instruction; and
transmit the new control instruction to other battery management chips, so that the other battery management chips perform automatic clock synchronization based on the clock synchronization information carried in the new control instruction; wherein the other battery management chips are battery management chips among the multiple battery management chips except for the first battery management chip, and a daisy chain with a sinusoidal sawtooth waveform is used for isolated communication between different battery management chips.

14. The electronic device according to claim 13, wherein processor is further configured to:
at initialization of each of the multiple battery management chips, configure a scheduler mode parameter of the battery management chip, wherein the scheduler mode parameter comprises at least one of: a balancing start time, a settling time after balancing, a preparation time before self-diagnosis of a balancing circuit, a preparation time before open wire self-diagnosis of a battery collection wire, and a time required for collecting battery voltage or temperature; and
in response to a scheduler mode start instruction received by the battery management chip, execute a communication task in a cyclic manner according to the scheduler mode parameter.

* * * * *